United States Patent [19]

McCracken et al.

[11] Patent Number: 5,004,310

[45] Date of Patent: Apr. 2, 1991

[54] WIDE ANGLE LINE SCANNER

[75] Inventors: William L. McCracken, Wayland; Paul D. McDonald, Waltham; Roger S. Kirschner, Newton, all of Mass.

[73] Assignee: Honeywell Inc., Minneapolis, Minn.

[21] Appl. No.: 353,977

[22] Filed: May 19, 1989

[51] Int. Cl.⁵ .................. G02B 26/08; G02B 27/00
[52] U.S. Cl. ..................... 350/6.8; 350/276 SL
[58] Field of Search ............ 350/6.5, 6.7, 6.8, 1.1, 350/321, 276 SL, 276 R, 486, 504, 505, 619, 620

[56] References Cited

U.S. PATENT DOCUMENTS 3,211,046 10/1965 Kennedy ..................... 88/1
3,637,281 1/1972 Gull ........................ 350/6.7
3,650,629 3/1972 Erickson .................... 350/6.8
4,124,269 11/1978 Beckmann ................... 350/6.8
4,241,257 12/1980 Koester .................... 350/6.7
4,460,240 7/1984 Hudson ..................... 350/6.8

Primary Examiner—Bruce Y. Arnold
Assistant Examiner—James Phan
Attorney, Agent, or Firm—Kinney & Lange

[57] ABSTRACT

Apparatus for scanning a remote object with a radiation detector and which prevents narcissus, ghost and stray radiation effects by providing radiation blocking means positioned to intercept all but the desired paths between a remote object and the detector.

13 Claims, 2 Drawing Sheets

WIDE ANGLE LINE SCANNER

BACKGROUND OF THE INVENTION

1. Field of the Invention

The present invention relates to a system for scanning a remote object, such as the earth, from an aircraft or satellite and, more particularly, to an improvement over a scanning system disclosed in an H. V. Kennedy U.S. Pat. No. 3,211,046, dated Oct. 12, 1965.

2. Description of the Prior Art

In FIG. 4 of the above-referred to Kennedy patent, a scanning system is shown which employs a rotating triangularly arranged mirror to receive radiation generated from a remote object, such as the earth, and to transmit that radiation to a plurality of folding mirrors and to a parabolic mirror where the energy is focused onto a radiation detector for purposes of producing an output indicative of the radiation received from various parts of the remote object. The outputs from the detector may be used for producing a picture or map of the object being scanned.

The Kennedy system has the problem of permitting stray radiation, ghost image radiation and narcissus reflection (described below) to reach the detector at unwanted times, and thereby cause an erroneous output to be produced. A narcissus reflection permits the detector, which in infrared systems is surrounded by a dewar which is at a very cold temperature, to "see" itself, i.e. a path from the detector to the parabolic mirror, through the folding mirrors and the rotating mirror, back to the parabolic mirror and then to the detector is provided. This is undesirable except once during calibration, because the very low temperature of the dewar around the detector is reflected back to the detector to produce a false reading. Ghost radiation is radiation other than that from the area of the remote object which is presently under observation and which finds a path to the detector which is generally parallel to the radiation from the area and thus appears, falsely, to come from the area. Stray radiation is all other radiation reaching the detector other than that from the area under observation. All narcissus, stray and ghost radiation adversely affect the output of the detector and are undesirable.

SUMMARY OF THE INVENTION

The present invention overcomes the stray radiation, ghost imaging, and narcissus effects of the prior art by incorporating in the system at least two light absorbing baffles which are strategically placed at positions where they block any radiation coming in from a stray angle or a ghost angle, and block the narcissus radiation from the detector itself.

DETAILED DESCRIPTION OF THE PREFERRED EMBODIMENT

Figure 1:
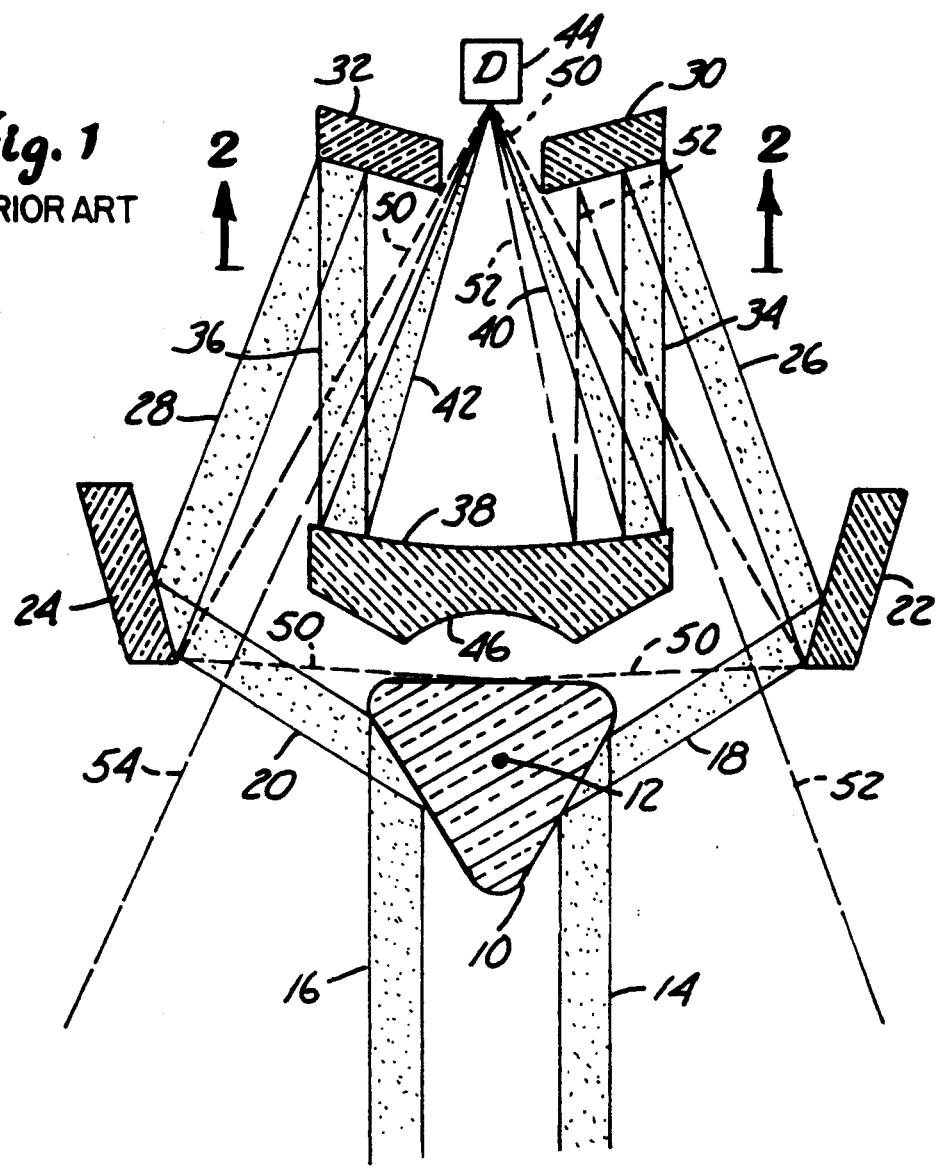
FIG. 1 is a slightly modified reproduction of FIG. 4 of the Kennedy U.S. Pat. No. 3,211,046 showing the structure of the prior art but with the rotating triangular mirror at a zero degree position so as to show the stray, ghost and narcissus rays.
Figure 4:
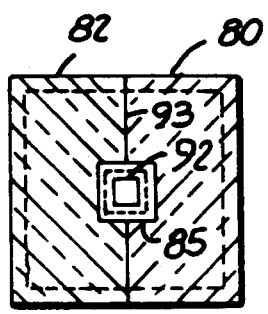
FIG. 4 is a view of the folding mirrors of FIG. 3 taken along line 4—4 therein.

As mentioned above, FIG. 1 shows the prior art as seen in FIG. 4 of the Kennedy U.S. Pat. No. 3,211,046 except that the rotatable triangular mirror 10 is shown pointing downward in the zero degree position. In FIG. 1, the rotatable triangular mirror 10 rotates about an axis 12 which is into and out of the plane of the drawing.

Light or infrared radiation from a remote object (not shown) travels to mirror 10 over paths as shown by shaded areas 14 and 16 when mirror 10 is at the zero degree position. These rays strike the mirror surfaces of member 10 and are reflected thereby along paths such as shown by shaded areas 18 and 20 to first and second folding mirrors 22 and 24, respectively. Mirrors 22 and 24 reflect the radiation more or less upwardly along paths shown by shaded areas 26 and 28 to third and fourth folding mirrors 30 and 32, respectively. Mirrors 30 and 32 reflect the radiation downwardly along paths shown by shaded areas 34 and 36 to a paraboloidal mirror 38. The radiation is reflected and focused by the paraboloidal mirror 38 upwardly along paths such as shown by shaded areas 40 and 42 to a radiation detector 44 which may be an infrared detector and which may be mounted in a dewar (not shown) and subjected to a very cold cryogenic environment as is well known in the art.

As triangular mirror 10 rotates about axis 12, the direction that it receives radiation from the remote object will change with the rotation, but the energy received will travel therefrom to folding mirrors 22, 24, 30 and 32, and to paraboloidal mirror 38 in generally the same directions as are shown in FIG. 1 to be received by the detector 44.

It is noted that a cutout portion 46 is included at the back side of paraboloidal mirror 38 and the corners of triangular mirror 10 have been rounded so that rotation can occur without collision. It is also desirable in the Kennedy apparatus to have mirrors 10 and 38 be as close as possible to minimize a path for radiation therebetween.

Figure 2:
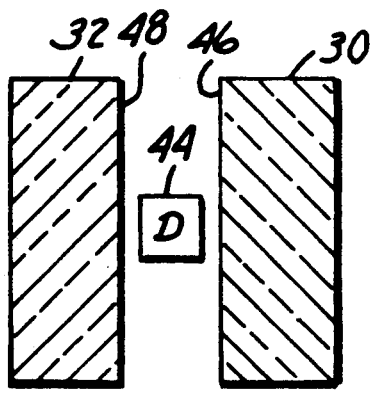
FIG. 2 is a view of the folding mirrors of FIG. 1 taken along the line 2—2 therein.

FIG. 2 shows a view of folding mirrors 30 and 32 and detector 44 as seen from lines 2—2 of FIG. 1. It is seen that detector 44 lies in an area bounded by parallel sides 46 and 48 of mirrors 30 and 32, respectively. It should be noted that the size of the mirrors 30 and 32 is decreased by virtue of the slot formed between edges 46 and 48. This reduces the amount of radiation which can reach the detector 44 and thus decreases the sensitivity of the Kennedy system.

In the position shown in FIG. 1, a dashed line 50 is shown representing a path for radiation emanating from detector 44 which passes the corner of folding mirror 32 and travels down to the lower end of folding mirror 24 where it is reflected over to the center of the top surface of triangular mirror 10, and then to the lower end of folding mirror 22 for reflection upwardly just past the corner of folding mirror 30 to detector 44.

Dashed line 50 can be considered as representative of a bundle of rays forming a relatively thin band of energy which starts at detector 44 and is re-reflected by the system back to detector 44 to produce the "narcissus" effect. Since, in an IR system, the detector's output is dependent upon the temperature of the energy it receives, and since the dewar surrounding the detector is at a very cold temperature, the output of detector 44, when the mirror 10 is at the position shown in FIG. 1, will be deceptively low and in error.

Also shown in FIG. 1 is a dashed line 52 which represents a path for radiation, parallel to path 26, traveling between folding mirror 22 and paraboloidal mirror 38 and thereafter being reflected downwardly to the paraboloidal mirror 38 where it is focused on the detector 44. This path of energy, and a number of others parallel therewith, form a shaft of energy which, because it travels parallel to path 26, appears to come from the same source as the energy traveling along paths 14 and 16 from the remote object. This energy results in a "ghost image", discussed above, and produces erroneous readings.

A third undesired ray is represented in FIG. 1 as dashed line 54 which is shown traveling from some portion of the remote object between folding mirror 24 and paraboloidal mirror 38, and between folding mirrors 30 and 32 to detector 44. This ray is representative of a bundle of rays which, although not parallel to the path 28, nevertheless produce a source of radiation for detector 44 which is not part of the scene desired to be viewed. This radiation and other non-parallel radiation received by detector 44 forms the "stray" radiation referred to above, and is likewise undesirable.

There may, of course, be bundles of rays other than those shown at positions 50, 52 and 54 which can travel to the detector and form narcissus, ghost and stray radiation paths from other directions and at other positions of the rotating triangular member 10. Since all of these paths of radiation are undesirable, it is of considerable value to be able to eliminate them.

Figure 3:
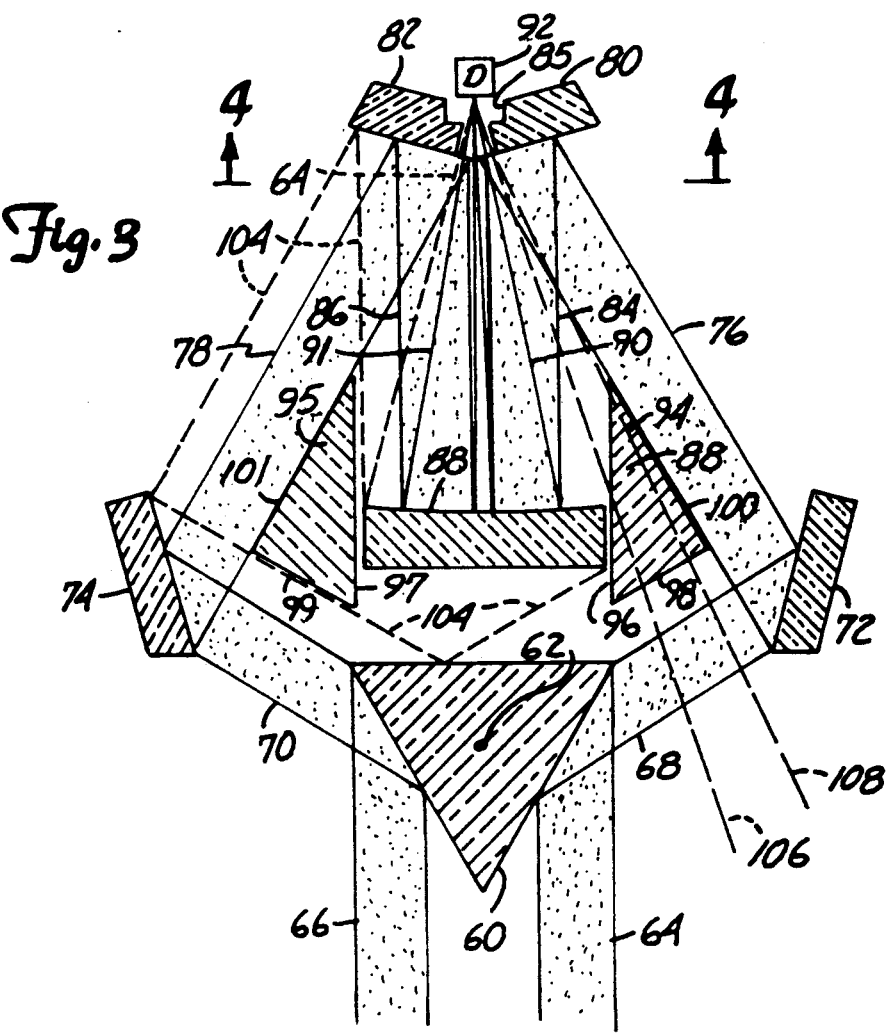
FIG. 3 shows the scanning system of present invention in about the same general configuration as FIG. 1.

FIG. 3 shows the apparatus of the present invention arranged with its components positioned similarly to FIG. 1. In FIG. 3, a rotating triangular mirror 60 is shown rotatable about an axis 62 into and out of the plane of the drawing. Energy, which may be light or infrared energy, travels to mirror 60, at the zero degree position, over paths shown as shaded areas 64 and 66, respectively. This energy is reflected from the two lower faces of triangular mirror 60 upwardly and to the right and left, respectively, along paths shown as shaded areas 68 and 70 to folding mirrors 72 and 74, respectively. The energy is reflected from mirrors 72 and 74 upwardly along paths such as shown by shaded areas 76 and 78 to folding mirrors 80 and 82, respectively. The energy is again reflected from mirrors 80 and 82 downwardly along paths shown as shaded areas 84 and 86 to a paraboloidal mirror 88. Paraboloidal mirror 88 re-reflects and focuses the radiation along paths such as shown by shaded areas 90 and 91 to a detector 92 located just above an aperture 85 formed between mirrors 80 and 82, respectively. It should be noted that paraboloidal mirror 88 has a flat back and that the triangular tips of rotating mirror 60 are not rounded as was the case in FIG. 1. This allows the mirrors to be constructed much more easily and economically than the mirrors in FIG. 1. The reason this can be accomplished is that the spacing between the triangular mirror 60 and the paraboloidal mirror 88 need not be so small because unwanted paths for radiation between the two mirrors are blocked by other means, as will be shown.

FIG. 4 shows the mirrors 80 and 82 and detector 92 as seen from a view taken along line 4—4 of FIG. 3. In FIG. 4, it is seen that mirrors 80 and 82 abut each other along a line 93 and that aperture 85 forms only a small square hole in the surface of the mirrors to allow the detector 92 to receive radiation. This provides a greater mirror surface area which permits a greater amount of radiation to be reflected by mirrors 80 and 82 than was possible with the slot arrangement shown in the FIGS. 1 and 2.

Returning to FIG. 3, a pair of triangular light blocking members 94 and 95 are shown mounted with vertical edges 96 and 97, respectively, almost touching the edges of paraboloidal mirror 88 so as to minimize any light path therebetween but to allow expansion and contraction of mirror 88 without introducing any distortion therein. Lower edges 98 and 99 of triangular light blocking members 94 and 95, respectively, are shown to be parallel to the light paths 68 and 70, respectively, and upper edges 100 and 101 of light blocking members 94 and 95, respectively, are shown to be parallel to the light paths 76 and 78, respectively.

A dashed line 104 is shown in FIG. 3 emanating from detector 92 and passing just adjacent the edge of aperture 85 near mirror 82 to the left-hand corner of paraboloidal mirror 88 where it is re-reflected upwardly to the left-hand corner of mirror 82 and re-reflected downwardly to the upper corner of folding mirror 74. From mirror 74 it travels along toward the upper surface of triangular mirror 60 and is reflected thereoff along a path traveling upwardly and to the right. Dashed line 104 is an attempt to show a narcissus path for radiation but, because of the light blocking member 94, the path terminates and does not reach mirror 72 and thus cannot be re-reflected through the system back to detector 92. The same is obviously true for a similar path from detector 92 to the right past mirror 80 except that light blocking member 95 acts as the blocking member in this case. While other attempts to draw paths from detector 92 through the system and back to itself may be made, it will be seen that all of them will be blocked by the light blocking members 94 and 95 or by the mirrors themselves and, accordingly, the narcissus radiation effect is eliminated.

A dashed line 106 is also shown in FIG. 3 which is drawn to correspond with dashed line 54 shown in FIG. 1 (although, in this case, on the other side of triangular mirror 60) as an attempt to show the way stray radiation would have arrived at the detector 92 had it not been for the triangular blocking member 94 (or, if on the left of mirror 60, blocking member 95). This stray radiation path and all other attempts to draw such paths in the arrangement of FIG. 3 are prevented by the light absorbing members 94 and 95 or by the mirrors themselves and thus the problem with stray radiation has been eliminated.

Finally, dashed line 108, drawn parallel to path 76, shown just past the lower left-hand edge of folding mirror 72 but striking the blocking member 94, is an attempt to draw a path for "ghost" radiation, but it is seen that all such attempts will intersect light blocking members 94 and 95 or the mirrors themselves and thus prevent "ghost" radiation from reaching detector 92.

Since all paths attempted to be drawn which would provide stray radiation, "ghost" images or narcissus effect in FIG. 3 are prevented by the blocking members 94 and 95 or by the mirrors themselves, it is seen that the structure of FIG. 3 provides a system which eliminates the undesirable radiation paths existent in the prior art of FIG. 1.

To find the exact position for the blocking members 94 and 95 in the present invention, the mirror 60 may be rotated and rays from the remote object to the detector are traced to determine the desired path limits. Then, knowing the desired paths, the light blocking members are positioned to have edges closely adjacent to the desired paths and also close adjacent to the paraboloidal mirror 88.

Because of the ability of the present invention to eliminate the undesired radiation, the present invention has greater sensitivity, greater accuracy, and a far better signal to noise ratio than is available with the apparatus of the prior art.

Although the present invention has been described with reference to preferred embodiments, workers skilled in the art will recognize that changes may be made in form and detail without departing from the spirit and scope of the invention.

What is claimed is:

1. A scanner comprising:
   a rotatable member having a first reflecting surface, radiation being presented to the first reflecting surface from one of a plurality of different directions depending upon the rotational position of the rotatable member, the radiation received being reflected as a first beam along a first direction;
   a second member having a second reflecting surface and mounted to receive the first beam and to reflect the radiation as a second beam along a second direction;
   a third member having a third reflecting surface and mounted to receive the second beam and to reflect the radiation as a third beam;
   radiation detector means mounted to receive the third beam and to produce an output in accordance with the radiation received; and
   radiation blocking means mounted adjacent to both the first and second beams so as to block any radiation from reaching the detector means other than that reflected by the rotatable member from a desired one of the plurality of directions.

2. Apparatus according to claim 1 wherein the radiation detector means includes a radiation detector and focusing means mounted to focus the radiation in the third beam onto the detector.

3. Apparatus according to claim 1 wherein the rotatable member is rotatable about a first axis and the first reflecting surface includes three planar mirrors arranged parallel to the first axis.

4. Apparatus according to claim 3 wherein the three mirrors form a triangle about the first axis.

5. Apparatus according to claim 1 wherein the first and second reflecting surfaces are plane rectangles and the cross section of the first and second beams are rectangular.

6. Apparatus according to claim 5 wherein the blocking means includes a first straight edge which is adjacent to one edge of the rectangular cross section of the first beam and a second straight edge which is adjacent to one edge of the rectangular cross section of the second beam.

7. Apparatus according to claim 2 wherein the focusing means is a mirror which is paraboloidal about a second axis and is mounted in the third beam to reflect and focus the radiation along the second axis to the detector.

8. Apparatus according to claim 7 wherein the paraboloidal mirror has a first edge remote from the second axis and lying closely adjacent to the blocking means.

9. Apparatus according to claim 8 wherein the first and second reflecting surfaces are plane rectangles and the cross section of the first and second beams are rectangular.

10. Apparatus according to claim 9 wherein the blocking means includes a first straight edge which is adjacent to one edge of the rectangular cross section of the first beam, a second straight edge which is adjacent to one edge of the rectangular cross section of the second beam and a third straight edge which is adjacent to the edge of the paraboloidal mirror.

11. A wide angle scanner for use with an infrared detector for imaging infrared energy from various parts of a remote object comprising:
   a rotatable reflector having a triangular cross section to receive infrared energy from the various parts of the remote object depending on the angle of rotation of the reflector and to reflect the energy along a first path;
   first infrared energy deflecting means for receiving reflected energy from the rotatable reflector along the first path and redirecting it along a second path to the detector; and
   energy blocking means having a first edge adjacent to the first path and a second edge adjacent to the second path, the energy blocking means operable to block any infrared radiation outside of the first and second paths from reaching the detector.

12. A method of preventing radiation from reaching a radiation detector in a scanning system, having a rotatable reflector with a plurality of reflecting surfaces and having a plurality of other reflectors for receiving radiation from a remote object which is reflected off one of the surfaces and directing it to the detector, along paths other than predetermined paths comprising the steps of:
   rotating the reflector to determine the location of the predetermined paths;
   defining other paths whereby radiation could reach the detector; and
   positioning light absorbing material in the other paths and outside of the predetermined paths so that radiation outside of the paths is blocked while radiation in the paths is unobstructed.

13. A scanner comprising:
   a rotatable member having a first reflecting surface, radiation being presented to the first reflecting surface from one of a plurality of different directions depending upon the rotational position of the rotatable member, the radiation received being reflected as a fist beam along a first direction;
   a second member having a second reflecting surface and mounted to receive the first beam and to reflect the radiation as a second beam along a second direction;
   a third member having a third reflecting surface and mounted to receive the second beam and to reflect the radiation as a third beam;
   radiation detector means mounted to receive the third beam and to produce an output in accordance with the radiation received; and
   radiation blocking means having first and second surfaces and mounted adjacent to both the first and second beams with the first surface extending parallel to the first beam and the second surface extending parallel to the second beam and positioned so as to permit the first and second beams to pass close to the first and second surfaces without being blocked thereby, the radiation blocking means operating to prevent radiation other than in the first and second beams from reaching the detector means.

* * * * *